(No Model.) 6 Sheets—Sheet 5.
J. T. BIBB & A. T. TIMEWELL.
AUTOMATIC SACK FILLING AND SEWING MACHINE.
No. 476,778. Patented June 14, 1892.
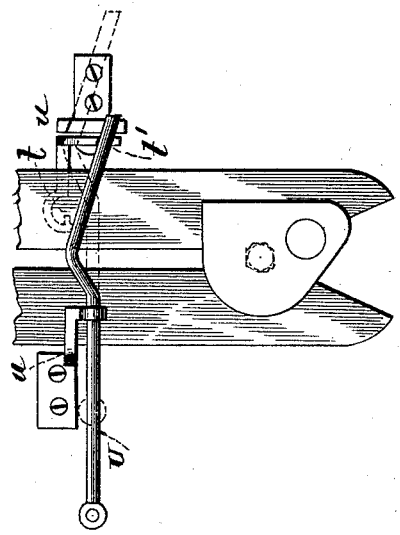
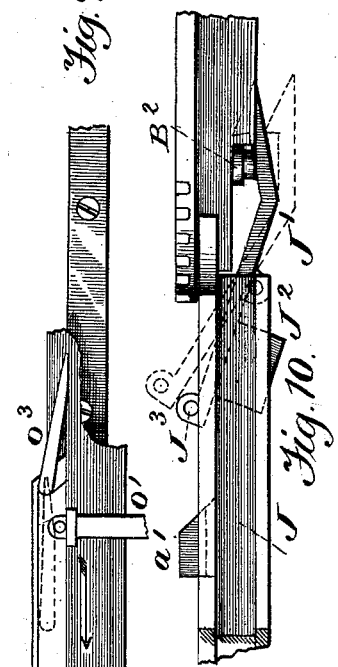
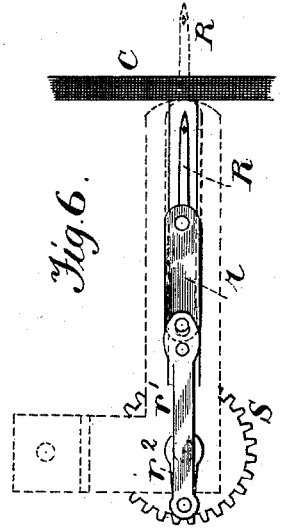
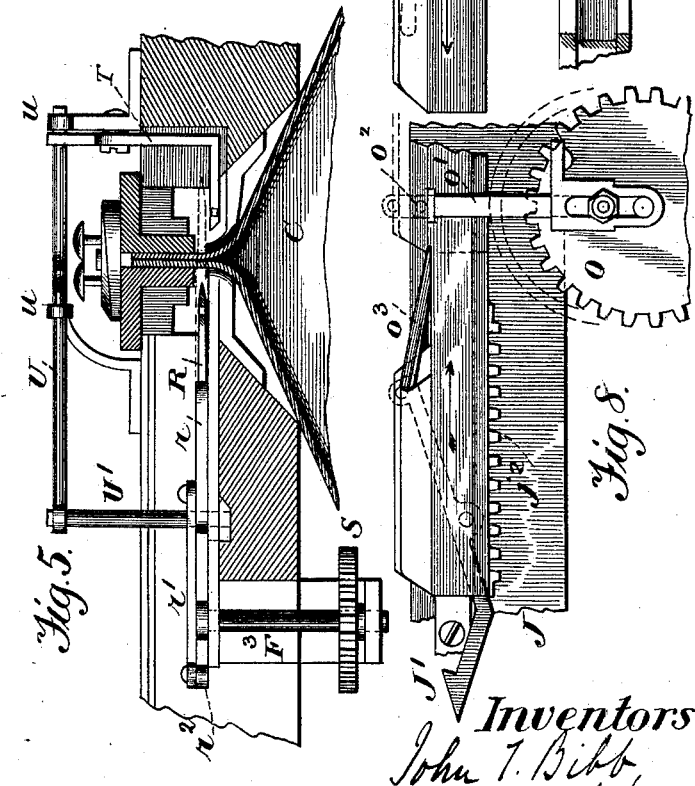
Witnesses:
A. Ruppert.
E. Cruse.
Inventors:
John T. Bibb,
Arthur T. Timewell,
by Geo. W. T. Howard
Atty.

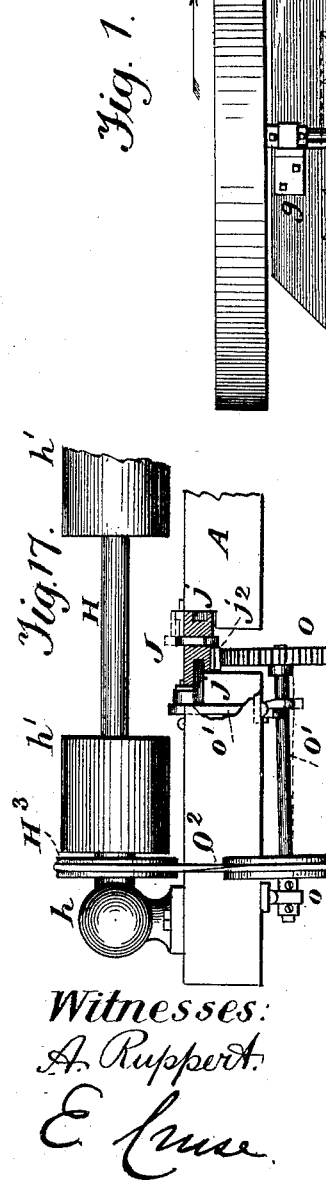

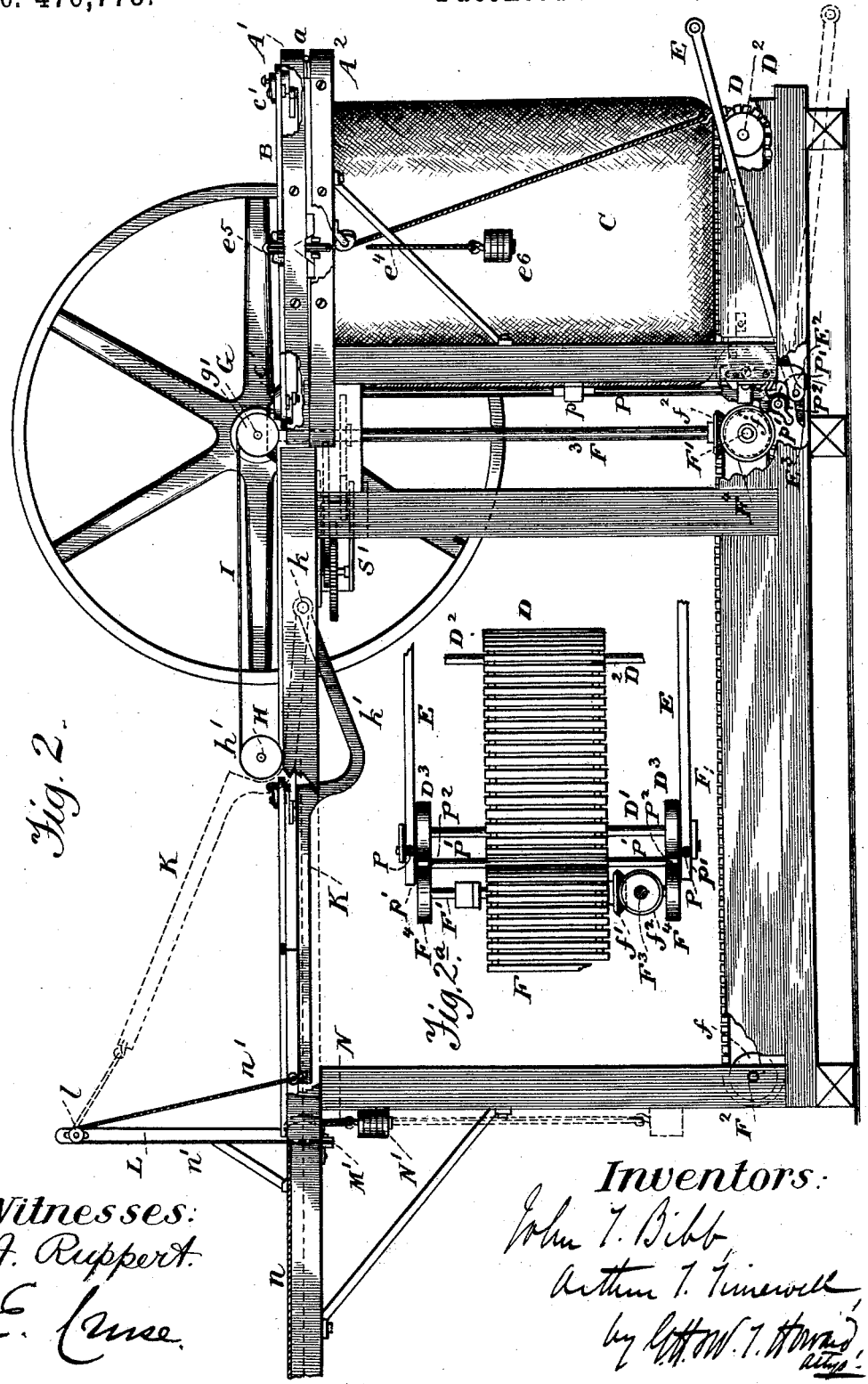

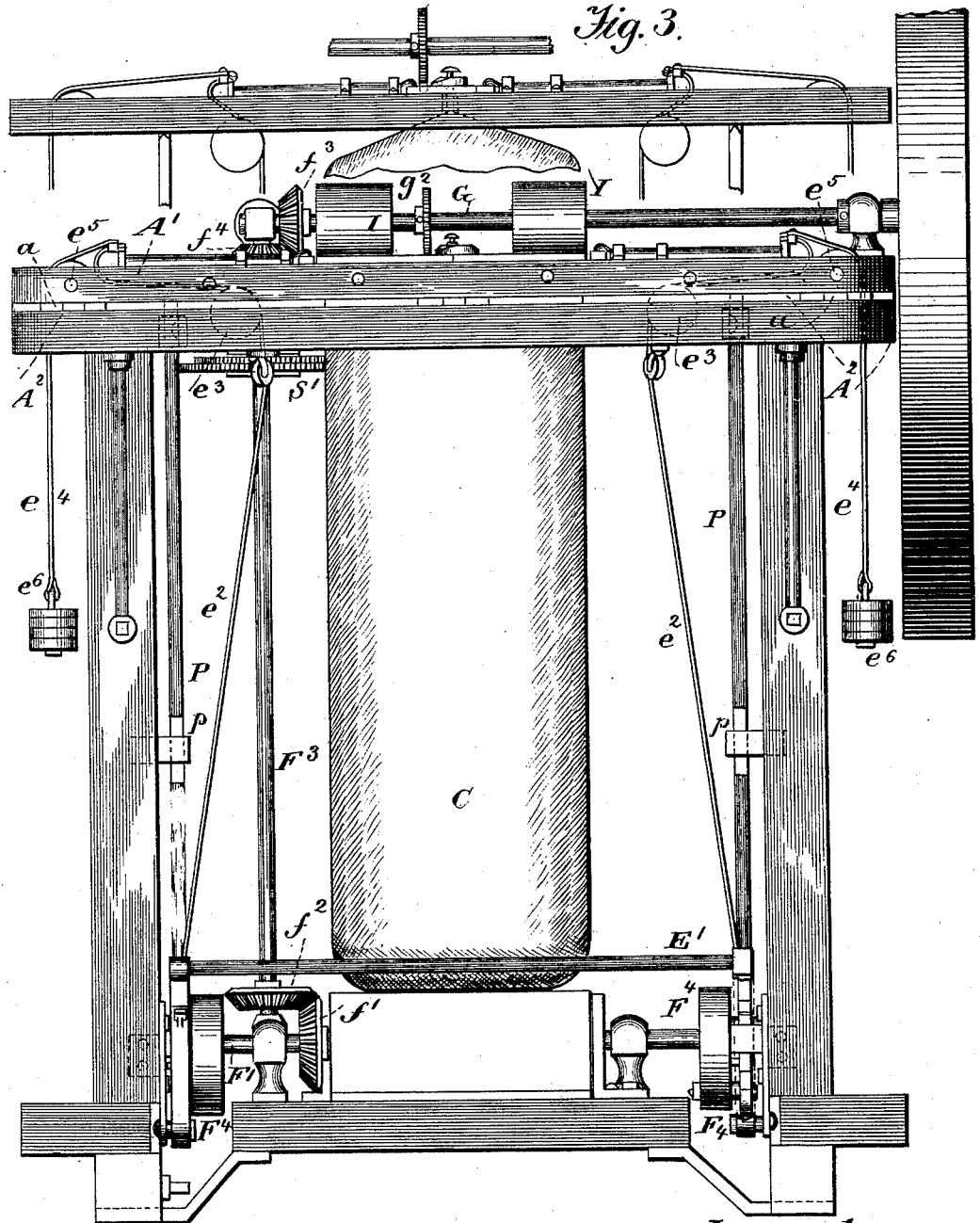

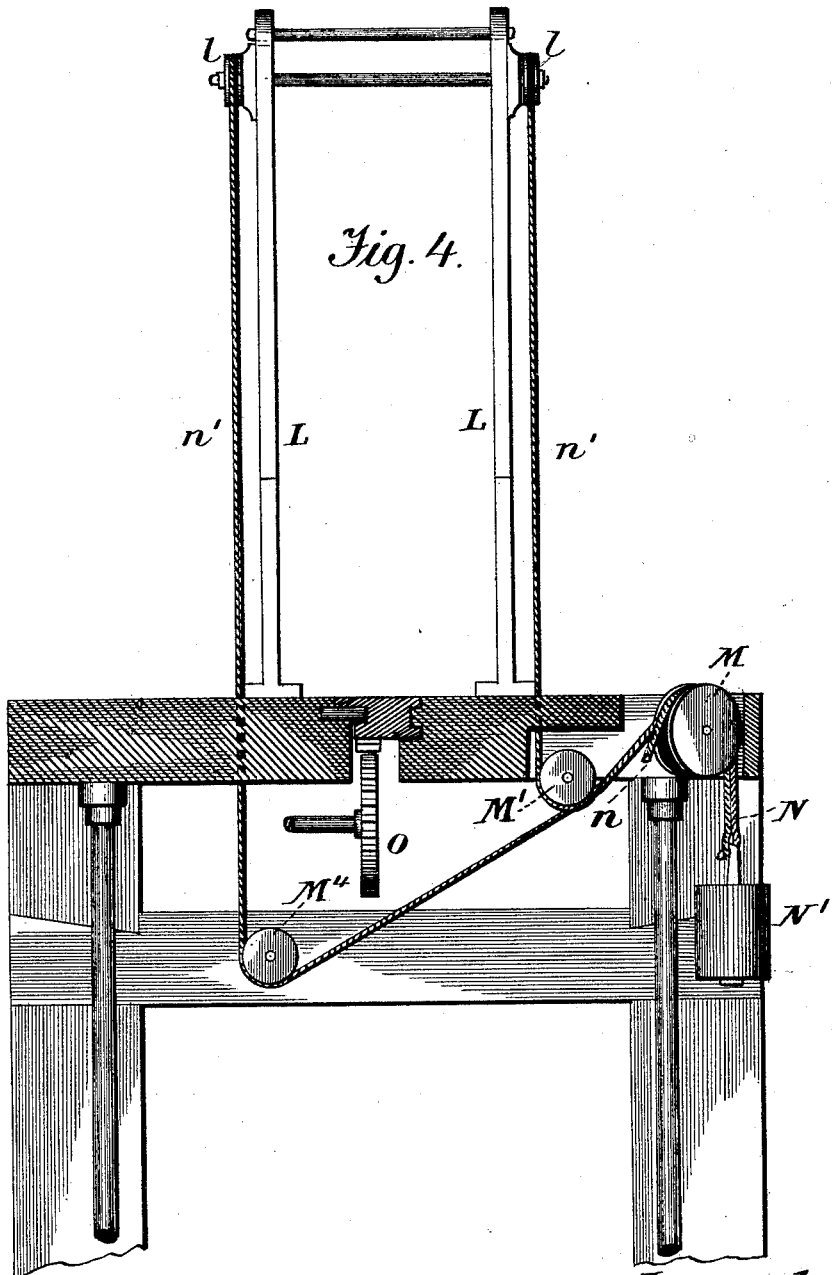

(No Model.) 6 Sheets—Sheet 6.
J. T. BIBB & A. T. TIMEWELL.
AUTOMATIC SACK FILLING AND SEWING MACHINE.
No. 476,778. Patented June 14, 1892.
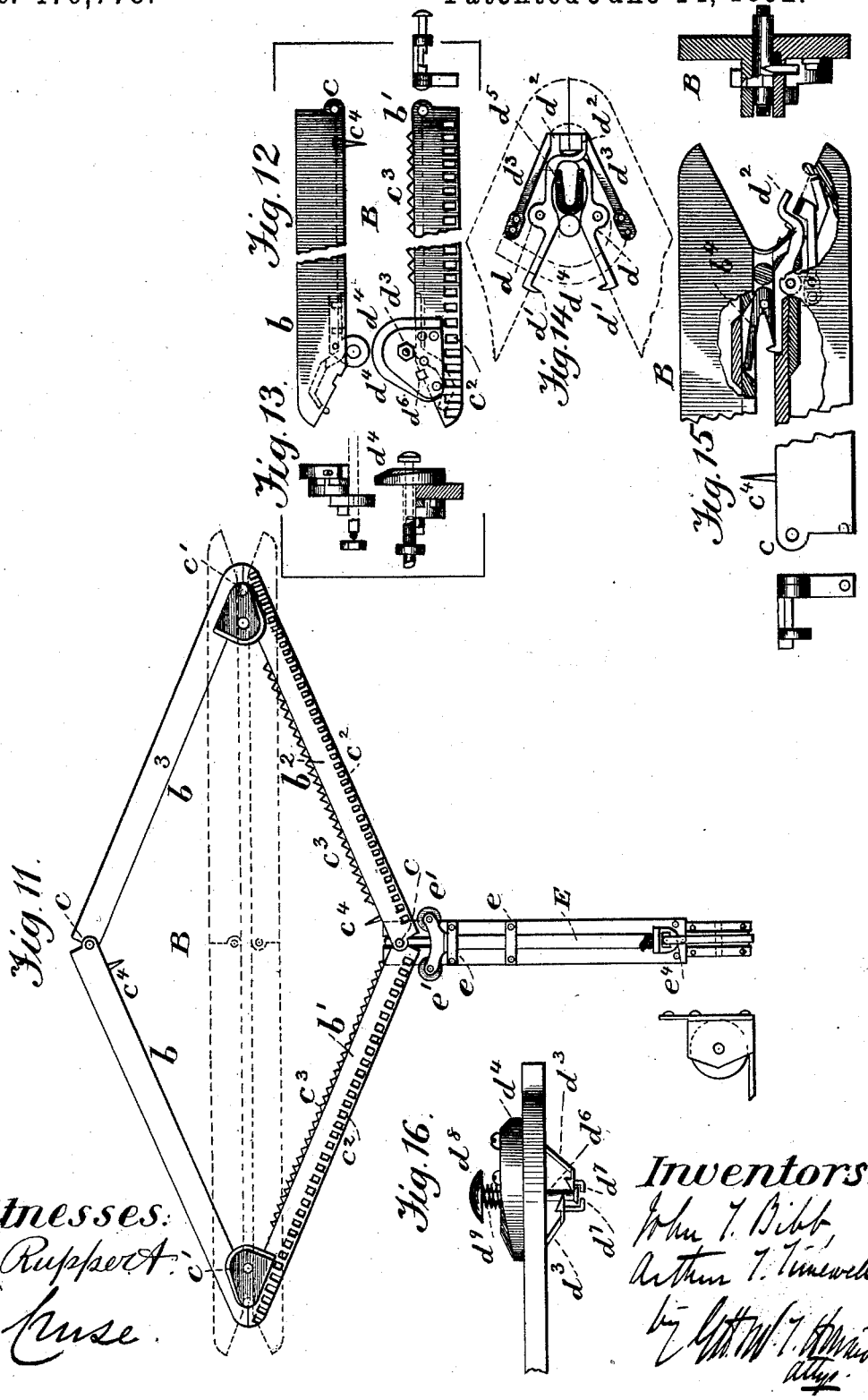

UNITED STATES PATENT OFFICE.

JOHN T. BIBB AND ARTHUR T. TIMEWELL, OF SPOKANE FALLS, WASHINGTON.

AUTOMATIC SACK FILLING AND SEWING MACHINE.

SPECIFICATION forming part of Letters Patent No. 476,778, dated June 14, 1892.

Application filed August 13, 1891. Serial No. 402,538. (No model.)

*To all whom it may concern:*

Be it known that we, JOHN T. BIBB and ARTHUR T. TIMEWELL, both of Spokane Falls, in the county of Spokane and State of Washington, have invented certain new and useful Improvements in Automatic Sack Filling and Sewing Machines, of which the following is a specification, reference being had to the accompanying drawings and to the letters of reference marked thereon.

This invention relates to means for sacking grain, ore, and other materials and for sewing the sacks after they are filled.

In the accompanying drawings, Figure 1 is a plan of the machine; Fig. 2, a side elevation. Fig. $2^a$ is a plan, partly broken away, of a portion of the machine; Fig. 3, an end elevation; Fig. 4, a vertical transverse section on the line $x\ x$ of Fig. 1. Figs. 5, 6, and 7 are detached views of the sewing mechanism, on an enlarged scale. Figs. 8, 9, and 10 are side elevations of detached parts of the machine. Fig. 11 is a plan of the sack-holder. Figs. 12, 13, 14, 15, and 16 are details showing the construction of the sack-holder; and Fig. 17 is a view, on an enlarged scale, of part of the mechanism shown in Fig. 4.

Similar letters of reference indicate similar parts in the several figures.

The table consists of two sections A and A', the latter being connected at its outer end only to the frame $A^2$ by the hinges $a$. The section A' is normally somewhat lower than the section A, as shown in Fig. 2.

B is the sack-holder, and C the sack attached thereto and extending down through a suitable opening in the table, so as to rest on a carrier belt or floor D.

The sack-holder B consists of four bars $b\ b'$ $b^2\ b^3$, hinged together at their ends, as seen at $c\ c$ and $c'\ c'$. The construction of the sack-holder is shown on an enlarged scale in Figs. 11, 12, 13, 14, 15, and 16. The bars $b'\ b^2$ on their upper faces are each provided with a rack $c^2$, each of said bars being serrated on its inner edge, as shown at $c^3$. The bars $b$ and $b^2$ are each provided with a hook $c^4$, the hooks being near the hinges $c$. The object of the serrations $c^3$, hooks $c^4$, and racks $c^2$ will be hereinafter referred to. The ends of each bar at the joints $c'$ extend beyond the hinging-points and are beveled, as shown in Fig. 12 and in dotted lines in Fig. 11, in order that the sack-holder may be opened. (See Fig. 11.) Each bar is provided with a recess at its beveled end, in which is pivoted a catch $d$, having a hook $d'$ at its forward end and bent behind the pivot, as shown at $d^2$. When the sack-holder is closed, the bent end $d^2$ of each catch will project out from the beveled end of its bar, as shown in Fig. 15. When the sack-holder is open, as shown in Fig. 14, the bent ends $d^2$ of the catches will cross each other and engage the spring-hooks $d^3$, attached to the under side of the bars. The hooked end of each of the catches $d$ will thus be held close to the edge of the bar in which it is pivoted and against the force of a U-shaped spring $d^5$, which bears against the bent ends of the catches.

In order to release the catches $d$ from the spring-hooks $d^3$, we employ a pin $d^6$, which passes through a plate $d^4$, secured to one of the side bars of the sack-holder, and engages the lugs $d^7$ on the spring-hooks $d^3$. The pin is provided with a button $d^8$ at its upper end, and a spring $d^9$ is interposed between the button and the plate $d^4$. The holder is forced into and maintained in an open position by a V-shaped spring $b^4$ at each of the joints $c'$. In Fig. 15 this spring $b^4$ is shown compressed.

E E are rods sliding in suitable guideways $e\ e$ on the table-section A'. Each rod carries at its inner end twin rollers $e'\ e'$, adapted to engage the bars of the sack-holder near the joints $c$. In order to close the sack-holder against the force of the springs $b^4$, the rods E E are drawn together by means of the ropes $e^2\ e^2$, passing over pulleys $e^3\ e^3$ and connected to the rods E E and a treadle E'. To retract the rods E E, we attach ropes $e^4\ e^4$ to their outer ends, which ropes pass over pulleys $e^5$ $e^5$ and carry the weights $e^6\ e^6$.

The table-section A is provided with a narrow opening $A^2$, through which the mouth end of the sack passes during the sewing operation.

B' B' are small pulleys arranged along each side of the opening $A^2$, between which the sack-holder passes and is maintained in a closed position during the operation of sewing the sack.

F is a traveling belt, onto which the sack passes from the carrier-floor D and by which it is carried to the point at which it is removed from the machine.

G is the main driving-shaft journaled in suitable bearings $g$, secured to the table-section A and projecting over the table-section A'. The shaft G carries two pulleys $g'$ $g'$, one on each side of the opening $A^2$ in the table. The shaft G also carries a spur-gear $g^2$, adapted to engage the racks $c^2$ on the sack-holder. A shaft H is mounted in adjustable bearings $h$ on the table-section A and carries the pulleys $h'$ $h'$ and the spur-gear $h^2$, the latter being adapted to engage the racks $c^2$.

I I are belts passing around the pulleys $g'$ and $h'$ and transmitting motion from the shaft G to the shaft H. The further function of these belts will be described hereinafter.

$A^3$ is a diamond-shaped opening in the table A, it being a continuation and enlargement of the opening $A^2$.

J represents a bar extending across the opening $A^3$ and grooved at each side to slide on ways $j$ $j$ on the table A for the purpose of supporting the forward end of the sack-holder as it is pushed across the opening $A^3$.

K K are lifting-bars pivoted at one end $k$ to the table A, the latter being slotted to receive them. In their normal position the bars K are slightly below the level of the table-section A, as shown in full lines in Fig. 2, and each bar is bent, as at $k'$, to enable it to be elevated, as designated by dotted lines in Fig. 2, without coming in contact with the pulleys $h'$ and belts I I.

L L are standards supported on the table-section A, each having a pulley $l$ near its upper end.

M, M', and $M^2$ indicate pulleys mounted in suitable bearings on the table-section A. (See Figs. 1 and 2.)

N is a rope, doubled and carrying a weight N' in its loop. The double rope passes over the pulley M and thence diverges, one part $n$ passing around the pulley $M^2$ and being secured to the end of the sliding bar J and the other part $n'$ passing under the pulley M' and thence over the pulley $l$ on one of the standards to the end of one of the lifting-bars K, to which it is secured. Another rope $n^2$, secured to the free end of the other lifting-bar K, passes over the pulley $l$ on the other standard L, and thence around a pulley $M^4$ on the frame of the machine to the rope $n'$, to which it is connected, by which arrangement both bars K are elevated simultaneously.

O is a spur-gear mounted on a shaft O', one end of which is supported in a fixed bearing $o$ on the under side of the table-section A and the other end in a vertically-moving bearing $o'$, which passes through a suitable opening in the table-section A and is provided with a pin $o^2$, with which a wedge-shaped cam $o^3$, pivoted on the sliding bar J, is adapted to engage in order to lift the spur-gear into engagement with the rack $j^2$ on the under side of the bar J. The rack $j^2$ and the spur-gear O will remain in engagement until the cam $o^3$ passes entirely under the pin $o^2$, when the bearing $o'$ will drop and disengage them. A hook J' is pivoted on the bar J and adapted to engage a lug $B^2$ on the under side of the sack-holder, the hook and lug being held in engagement by the weighted end $J^2$ of the hook. The hook J' and lug $B^2$ are disengaged by means of a wedge-shaped block $a'$ on the table-section A, with which a pin $J^3$ on the weighted end of the hook J' is adapted to engage as the sliding bar J nears the end of its travel. The object of this mechanism is to carry the sack-holder B forward after it has passed out of engagement with the spur-gear $h^2$. Motion is imparted to the spur-gear O by means of a belt $O^2$, passing around pulleys $O^3$ and $H^3$ on the shafts O' and H, respectively.

The traveling belt F travels around sprocket-wheels $f$ $f$ on the shafts F' $F^2$. The shaft F' also carries a bevel-gear $f'$, which meshes with the bevel-gear $f^2$ on the vertical shaft $F^3$, this shaft $F^3$ receiving its motion from the main shaft G through the medium of the bevel-gears $f^3$ $f^4$. The movement of the traveling belt F is constant during the operation of the machine. The shaft F' also carries at each end a friction-pulley $F^4$.

The carrier-floor D travels around sprocket-wheels on the shafts D' $D^2$, and the shaft D' carries at each end a friction-pulley $D^3$ similar and in close proximity to the pulleys $F^4$ on the shaft F'.

P P are rods having a limited vertical movement in bearings $p$ $p$, attached to the frame of the machine. The upper ends of these rods engage the free end of the table-section A, and their lower ends are bent and enlarged, as shown at $p'$. (See Fig. 2.) A shaft P', journaled in the ends $p'$, extends across the machine and carries at each end an idler-pulley $P^2$, adapted to be brought into engagement with the friction-pulleys $D^3$ and $F^4$, and thereby transmit motion to the former from the latter.

The treadle E' is pivoted to the frame of the machine at $E^2$ and has a projection $E^3$ on each arm extending beyond the pivotal point. When the treadle is depressed, the projections $E^3$ will engage and lift the rods P P, thereby raising the table-section A' to a level with the section A, and also bringing the idler-pulleys $P^2$ into engagement with the pulleys $D^3$ and $F^4$ to put the carrier-floor D in motion.

The sewing mechanism is illustrated in detail, on an enlarged scale, in Figs. 5, 6, and 7, and its location on the machine is indicated in the dotted lines Q of Fig. 1.

R represents the needle to which a reciprocating movement is given by means of the pitman $r$, connecting-rod $r'$, and crank $r^2$, the latter being on the vertical shaft $F^3$, which is driven by the spur-gear S through the medium of a suitable train of gearing, (indicated as a whole by the letter S' in Figs. 1 and 2,) it being shown in the former figure by dotted lines.

T is a rocking hook having a pin $t$ near its point, which catches the thread-loop from the point of the needle R and forms a chain-stitch. The rocking motion is imparted to the hook T by means of the bent rod U, which has a reciprocating movement and passes through an opening $t'$ in the heel of the hook T. The rod U is supported and guided in bearings $u$ $u$, and being connected to the pitman $r$ by the vertical post U' has a uniform movement therewith.

The operation is as follows: The sack-holder having been placed in position, as shown in Fig. 1, the operator stretches out the mouth of the sack at the hinges $c'$ $c'$ and presses on the button $d^3$, thereby releasing the catches $d$, whose hooked ends $d'$ are thereupon forced out by the spring $d^5$ to engage the sack. The sack must now be opened and its opposite sides attached to the hooks $c^4$ $c^4$, which will bring it into position to be filled. When the sack has been filled, the treadle E' must be depressed, causing the sliding bars E to approach each other, and thereby close the sack-holder against the force of the springs $b^4$. At the same time the table-section A' is elevated to the level of section A, thus bringing the rack $c^2$ into engagement with the spur-gear $g^2$, which will have the effect of pulling the sack-holder forward between the pulleys B'. The carrier-floor D will also be put in motion by reason of the idler-pulleys P² being forced by the depression of the treadle into engagement with the friction-pulleys D³ and F⁴. The sack will thus be moved onto the traveling belt F, and the mouth will pass along the narrow opening A² in the table-section A, during which passage it will be sewed. Before the sack-holder passes entirely from under the gear $g^2$ the gear $h^2$ on the shaft H will engage the rack $c^2$, and thus continue the movement of the sack-holder. When the forward end of the sack-holder reaches the triangular opening A³, it will engage and be supported by the sliding bar J in its further forward movement across the opening A³. As soon as the sack-holder passes from between the pulleys B' the springs $b^4$ will force it open, and thereby release it from the sack, the spring $a^3$ $a^3$ serving to limit its outward movement. The sack-holder will then occupy the position indicated by dotted lines in Fig. 1, it being over the lifting-bars K. As the sack-holder advances across the opening A³, it will push the sliding bar J in front of it, and thereby elevate the weight N' to the position shown in full lines in Fig. 2. When the sack-holder passes from under the spur-gear $h^2$, it is carried onward to the end of its travel by the spur-gear O, which engages the rack $j^2$ on the under side of the sliding bar J, as before mentioned. As soon as the sack-holder is disengaged from the hook J' on the sliding bar J and the rack $j^2$ from the spur-gear O the weight N' will drop to the position shown in dotted lines in Fig. 2, thereby causing the rope N and its branches to retract the sliding bar J and at the same time elevate the lifting-bars K and with them the sack-holder B. The latter will slide down the inclined surface of the bars K onto the carrier-belts I I, which will return it to the table-section A' ready to be used with another sack.

We do not limit ourselves to the exact construction of devices herein described, as they may be variously modified in a mechanical sense without departing from the spirit of our invention.

We have described herein a sewing device in order that the operation of our machine may be fully understood; but we do not intend thereby to limit ourselves to the special form of sewing device illustrated and described in operating our machine, for it is obvious that other forms of sewing mechanisms might be used with equally good results. Neither do we intend to claim herein the special form of sewing device illustrated, as that may form the subject-matter of another application.

Having described our invention, we claim—

1. In a machine for filling and sewing sacks, the combination of a sack-holder, a device for closing said sack-holder and the mouth of the sack held thereby, a table, pulling-gears, and a sewing device, substantially as set forth.

2. In a machine for filling and sewing sacks, the combination, with a table and sack-holder, of pulling-gears mounted on said table and adapted to engage the sack-holder, a sewing device supported on the table, lifting-bars adapted to receive the sack-holder after the sewing is completed and the sack released from the holder, and carrier-belts adapted to receive the holder from the lifting-bars and return it to the initial point, substantially as specified.

3. The combination of the constantly-moving belt F with the intermittently-moving floor D and suitable means to intermittently transmit motion from the belt F to the floor D, substantially as specified.

4. The combination, with the sliding bar J and the sack-holder, of the lifting-bars K, a looped rope having branches attached to the ends of the lifting-bars and to the sliding bar, and a weight attached to the looped rope, substantially as specified.

5. A sack-holder consisting of four bars hinged together and springs at two opposite joints to force the holder open, combined with sliding bars adapted to engage the other two opposite joints of the holder, and means to actuate the bars to close the holder against the force of the springs, substantially as specified.

6. A sack-holder consisting of four bars hinged together and having a rack on two of its sides, forming a straight line when the holder is closed, combined with a spur-gear adapted to engage the rack and move the sack-holder, substantially as specified.

7. A table formed in two sections, one section being hinged to the frame at its outer end and normally lower than the other section, combined with a sack-holder having a rack on its upper face and initially supported on the lower section, a spur-gear mounted in bearings on the higher section, suitable means to elevate the lower section to the level of the higher to bring the rack into engagement with the spur-gear, and means to revolve the spur-gear to move the sack-holder, substantially as specified.

In testimony whereof we hereunto set our hands and seals.

JOHN T. BIBB. [L. S.]
ARTHUR T. TIMEWELL. [L. S.]

Witnesses:
T. P. STEARNS,
G. J. BOWMAN.